(12) United States Patent
Kools et al.

(10) Patent No.: US 7,942,274 B2
(45) Date of Patent: May 17, 2011

(54) HIGH-THROUGHPUT ASYMMETRIC MEMBRANE

(75) Inventors: Willem Kools, Reading, MA (US); Claire Marie Goulding, Groton, MA (US); Daniel Calnan, Peabody, MA (US); Timothy Dolan, North Chelmsford, MA (US)

(73) Assignee: Millipore Corporation, Billerica, MA (US)

( * ) Notice: Subject to any disclaimer, the term of this patent is extended or adjusted under 35 U.S.C. 154(b) by 482 days.

(21) Appl. No.: 11/639,026

(22) Filed: Dec. 14, 2006

(65) Prior Publication Data

US 2007/0187319 A1 Aug. 16, 2007

Related U.S. Application Data

(63) Continuation-in-part of application No. 10/439,057, filed on May 15, 2003, now abandoned, application No. 11/639,026, which is a continuation-in-part of application No. 11/403,091, filed on Apr. 12, 2006, which is a continuation of application No. 10/953,999, filed on Sep. 29, 2004, which is a continuation of application No. 10/414,553, filed on Apr. 15, 2003, which is a continuation of application No. 10/275,210, filed as application No. PCT/US01/16817 on May 22, 2001, now Pat. No. 7,229,665.

(60) Provisional application No. 60/381,468, filed on May 17, 2002, provisional application No. 60/206,623, filed on May 24, 2000.

(51) Int. Cl.
*B01D 69/06* (2006.01)
*B01D 71/00* (2006.01)

(52) U.S. Cl. ............. 210/500.21; 210/500.27; 210/506; 427/246; 264/45.5; 264/48

(58) Field of Classification Search .................. None
See application file for complete search history.

(56) References Cited

U.S. PATENT DOCUMENTS

| | | | | |
|---|---|---|---|---|
| 3,662,046 | A * | 5/1972 | Woo et al. ................. | 264/41 |
| 3,846,521 | A | 11/1974 | Osterholtz et al. | |
| 3,909,418 | A * | 9/1975 | Hunter et al. .............. | 210/336 |
| 4,032,309 | A * | 6/1977 | Salemme ................... | 521/180 |
| 4,148,734 | A | 4/1979 | Hilterhaus et al. | |
| 4,261,834 | A | 4/1981 | DeWinter | |
| 4,629,563 | A | 12/1986 | Wrasidlo | |
| 4,776,936 | A | 10/1988 | Smith et al. | |
| 4,840,773 | A * | 6/1989 | Wade ......................... | 422/124 |
| 4,868,222 | A | 9/1989 | Chau et al. | |

(Continued)

FOREIGN PATENT DOCUMENTS

EP 0194546 B1 9/1986
(Continued)

OTHER PUBLICATIONS

PCT International Search Report for PCT/US03/15390 (Forms PCT/ISA/210 and 220) mailed Aug. 26, 2003.
(Continued)

*Primary Examiner* — Krishnan S Menon

(57) ABSTRACT

A microporous asymmetrical membrane formed of one or more layers wherein the "tight" side of the membrane has an "opened" face or otherwise highly-porous reticulated surface is described. The microporous asymmetrical membrane has high throughput and high flux, even when used for filtering viscous materials, such as serum or plasma. The membrane's surface can be formed by ablation or solvation, or in a two or more layered structure, through an appropriate selection of casting dopes.

6 Claims, 13 Drawing Sheets

U.S. PATENT DOCUMENTS

| | | | |
|---|---|---|---|
| 4,894,157 A * | 1/1990 | Johnson | 210/490 |
| 4,902,422 A * | 2/1990 | Pinnau et al. | 210/500.23 |
| 5,246,743 A | 9/1993 | Kusuki et al. | |
| 5,444,097 A | 8/1995 | Tkacik | |
| 5,869,174 A | 2/1999 | Wang | |
| 5,886,059 A | 3/1999 | Wang | |
| 6,010,628 A * | 1/2000 | Akhatovich et al. | 210/500.36 |
| 2003/0209485 A1* | 11/2003 | Kools | 210/490 |

FOREIGN PATENT DOCUMENTS

| | | |
|---|---|---|
| EP | 0296519 A2 | 12/1988 |
| EP | 0296519 A3 | 12/1988 |
| EP | 0499381 A1 | 8/1992 |
| GB | 2238966 A | 6/1991 |
| JP | 2180624 | 7/1990 |
| WO | WO 94/12269 A1 | 6/1994 |
| WO | WO 01/89673 A2 | 11/2001 |
| WO | WO 01/89673 A3 | 11/2001 |
| WO | WO 02/04083 A3 | 1/2002 |

OTHER PUBLICATIONS

JP63093309 (Apr. 23, 1998) Abstract, esp@cenet database—Worldwide.

* cited by examiner

HIGH-THROUGHPUT ASYMMETRIC MEMBRANE

This application is a continuation-in-part of U.S. patent application Ser. No. 10/439,057 filed May 15, 2003, which claims the benefit of Provisional Patent Application No. 60/381,468 filed on May 17, 2002 and is also a continuation-in-part of U.S. patent application Ser. No. 11/403,091 filed on Apr. 12, 2006, which is a continuation U.S. patent application Ser. No. 10/953,999 filed Sep. 29, 2004, which is a continuation of 10/414,553 filed Apr. 15, 2003, which is a continuation of 10/275,210, the U.S. National Stage patent application based on PCT/US01/16817 filed May 22, 2001, which claims the benefit of U.S. Provisional Patent Application Ser. No. 60/206,623 filed May 24, 2000 all of which are incorporated herein in their entirety.

FIELD

In general, the present invention relates to asymmetric membranes and, more particularly, to an asymmetric membrane having a substantially reticulated surface microstructure and methods of making the same.

BACKGROUND

Asymmetric membranes—in use for many years—are characterized by having the pore size of the membrane vary as a function of location within the thickness of the membrane. The most common asymmetric membrane has a gradient structure, in which pore size gradually and continually increases from one surface (often referred to as the "tight" side) to the other (often referred to as the "open" side). These membranes are valued as they have a higher flux than comparable symmetric membranes. When used in the configuration with their larger pore side upstream, these membranes have greater throughput in many cases as compared to the comparable symmetric membranes. See, U.S. Pat. No. 4,261,834, issued to D. M. de Winter on Apr. 14, 1981. The asymmetrical membranes are used in a variety of applications such as food and beverage filtration, pharmaceutical and biopharmaceutical manufacture, laboratory filtration, water filtration and the like. Asymmetrical membranes based on aromatic sulphones such as polyethersulphones are known and are capable of use at elevated temperatures and highly acidic and basic conditions.

Asymmetric membranes all have a thick, dense surface region, or in many cases a skin formed on one surface and extending somewhat into its depth, e.g. a tight surface. See, U.S. Pat. No. 4,629,563, issued to W. Wrasidlo on Dec. 16, 1986. The dense surface and/or skin can be seen through the use of photomicrographs. The dense surface is shown as a continuous dense film surface punctuated by a myriad of pores. The skin can be seen in cross-sectional photomicrographs as a dense layer extending into the thickness of the membrane. See, U.S. Pat. No. 4,629,563.

More recently, a multiple layered asymmetric membrane has been produced. See PCT International Publication No. WO 01/89673. This membrane is formed of two or more layers that are co-cast simultaneously from two or more different solutions of membrane precursor material. Unique asymmetrical structures can be formed with the membranes of this invention.

While most asymmetric membranes work satisfactorily on water or aqueous based solutions, they tend to prematurely clog and have poor throughput with viscous or heavily loaded streams, even when used in the preferred open side upstream configuration. Such streams are relatively common and can include various food streams such as syrups and sugary products, serum streams as used in the biopharmaceutical or laboratory settings or blood, plasma and other blood products.

In light of the above, there is a need for a membrane having high throughput and flux, suitable for quickly filtering high volumes of fluid, e.g. viscous fluids.

SUMMARY

In certain embodiments the present invention is directed to a microporous asymmetrical membrane formed of one or more layers, wherein the "tight" side of the membrane has an "opened" or otherwise highly porous reticulated surface, said surface being configured to promote high throughput compared to previously described asymmetric membranes. The microporous asymmetrical membrane has high throughput and high flux, even when used for viscous fluids such as serum or plasma. In other embodiments the invention relates to a method of making an asymmetric membrane comprising a modified tight surface. The modified tight surface may be modified so as to provide a more open porous structure on the tight surface compared to a similar membrane without a modified tight surface. The tight surface may be modified by altering or adjusting conditions during the casting process or treated with an appropriate agent after the casting process.

In other embodiments the invention provides a method of increasing the surface porosity of a tight side of an asymmetric membrane comprising one or more of the following steps: a) adjusting the dew point near the surface of a freshly cast asymmetric membrane; b) adjusting the concentration of lacquer solids prior to casting the membrane; c) contacting a preformed membrane with an agent suitable for increasing the porosity of an asymmetric membrane tight side.

While the present invention is not intended to be limited to any theory used in explanation thereof, it is believed that the highly porous reticulated surface may provide comparatively more openings for flow, and may provide greater interconnectivity among different pores in the structure, hence reducing the propensity of the pores to plug completely.

The membrane surface can be modified, compared to prior art asymmetric membranes by ablation or salvation, or in a two or more layered structure, through a so-called "co-cast" methodology involving an appropriate selection of casting dopes and conditions.

DETAILED DESCRIPTION

Figure 1A:
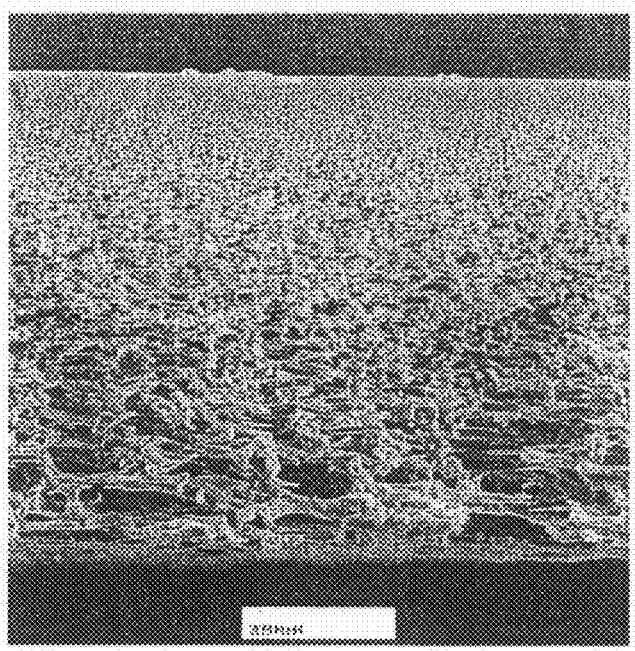
FIG. 1A shows a photomicrograph of a "skinless" asymmetrical membrane in cross-section according to the prior art.
Figure 1B:
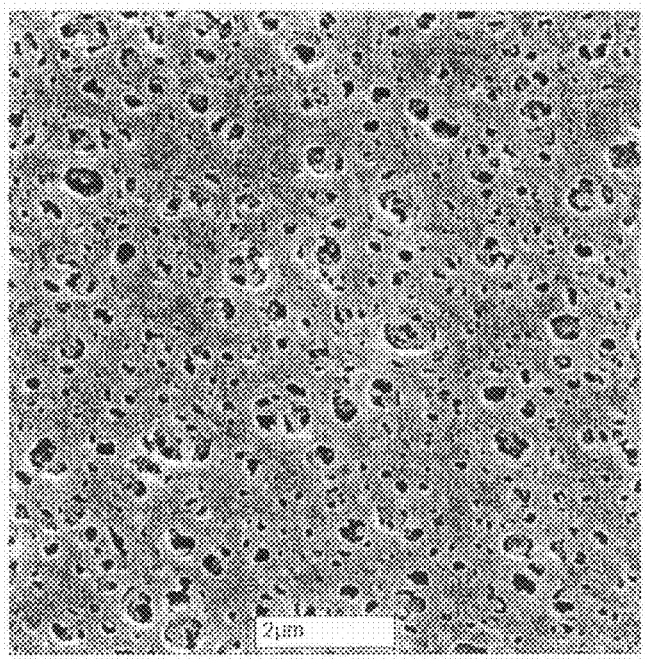
FIG. 1B shows the tight surface of the membrane of FIG. 1A according to the prior art.

Certain microporous asymmetrical membranes have a "skin" formed on their tight side. See e.g. U.S. Pat. No. 4,629,563. Those that don't have the "skin" often have a "skin type surface" having a reduced porosity tight surface. FIGS. 1A and 1B—illustrative of such prior art—show a cross section and a tight surface photomicrograph, respectively, of a skin-surfaced asymmetrical membrane. In FIG. 1B, the tight surface of the membrane has a relatively low percentage of porosity compared to membranes of the invention.

The present invention, in contrast, provides an asymmetrical microporous membrane well-suited for high throughput filtration, the membrane being distinguished by its modified open reticulated porous surface, formed or otherwise provided on the membrane rather than or instead of a skin or skin-type surface. In combination with other structural features, the modified open reticulated porous surface provides for, a bubble point normalized serum flow time of less than about 2.

Tight surfaces of asymmetric porous membranes may be modified to obtain the inventive open porous structure on the tight surface using any of the methods disclosed herein. These include controlling the humidity level of the casting environment while casting, adjusting the level of solids in the lacquer and employing a variety of post-casting physical modifications described below.

Figure 2A:
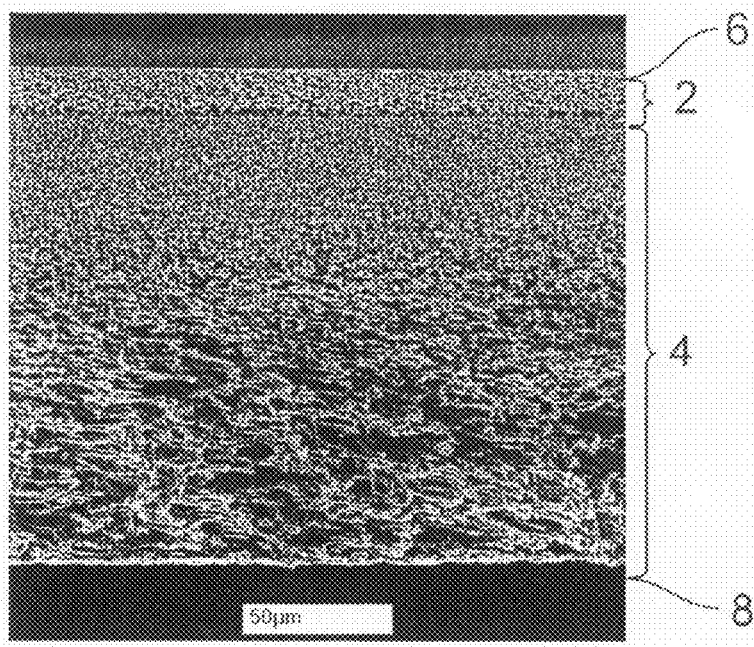
FIG. 2A shows a photomicrograph of a cross-section of a two-layered asymmetrical membrane according to the present invention.
Figure 2B:
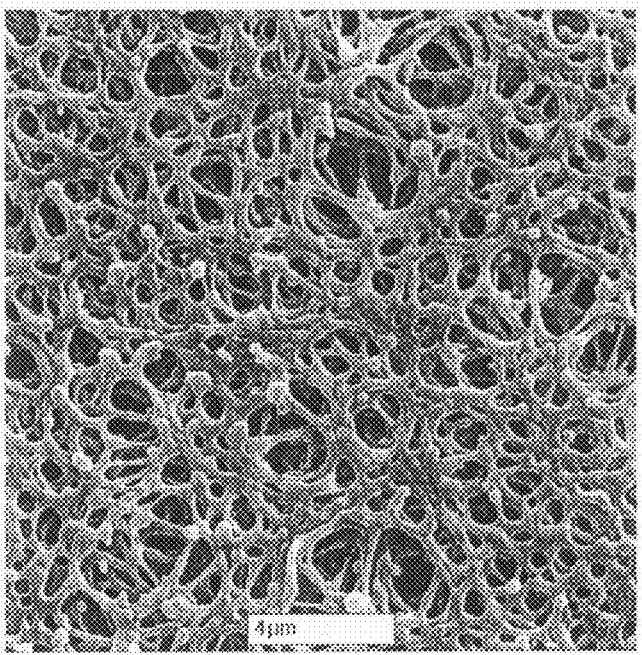
FIG. 2B shows the tight surface of the membrane of FIG. 2A, modified according to the invention.

One embodiment of the present invention is shown in FIGS. 2A and 2B. Two views of a membrane which has a tight surface modified according to the instant invention are shown. In this embodiment, the starting membrane structure may be formed of two layers, each cast from a different solution of membrane precursor, according to a base methodology that is disclosed in related PCT International Publication No. WO 01/89673. The tight side of the membrane has been modified during the casting process using the methods described infra. As seen in FIG. 2A, the structure shows the two layers 2 and 4 with asymmetric porosity throughout the structure from one side 6 to the other 8. The top layer 2 is relatively thinner than the bottom layer. As shown in FIG. 2B, the surface of the tight side of the membrane has an open, highly reticulated porous surface suitable for efficiently filtering viscous liquids such as animal or human serum. According to methods of the invention the tight side of a porous membrane may be modified during casting by adjusting the lacquer concentration e.g. to the top layer of a multi-layer membrane, adjusting the relative humidity of the casting conditions, or a combination of both.

A second embodiment of the present invention is made from a preformed single- or multiple-layered asymmetrical membrane in which the porosity of the tight side is too low for acceptable throughput or flux for its predetermined intended use. In accord with the invention, the tight surface of the membrane is modified to create a surface with higher porosity (i.e., the surface is "opened"), yielding an open, reticulated surface.

Post-formation modification is applicable to both single-layered asymmetric membranes and two-layered membranes made as per WO 01/89673 (i.e., in which the porosity of the tight side is still too low for acceptable throughput or flux).

Post-formation surface modification can be accomplished in a variety of ways: e.g., mechanically, chemically, or by exposure to irradiation.

Mechanically, certain membrane surfaces can be abraded with fine sandpaper or emery material (600 grit+); or sand-blasted with sand, silica, ground corn husk, or nut shells under conditions sufficient to yield an open, reticulated surface.

Chemically, certain membrane surfaces can be exposed to a solvent to partially remove surface polymer material. Chemical modification has several advantages, among which is that the depth to which the solvent influences removal can be controlled. For example, the pores of the membrane can be filled with a non-solvent immiscible with the surface-modifying solvent, thus limiting interaction of the solvent to exposed non-solvent or other diluents will affect the concentration, and hence, reactivity of the solvent. Desirable methods will employ combination of both filling the pores with non-miscible non-solvent and controlling solvent concentration.

Certain membrane surfaces can also be exposed to electromagnetic radiation of intensity, a wavelength, and for duration sufficient and/or appropriate to remove, or render removable, exposed portions of the surface polymer material. Methods of irradiation include, but are not limited to, corona discharge, plasma ablation, and laser ablation. Details of such methods are available in the patent and technical literature.

Generally when forming a multi-layered structure, the skilled artisan will appreciate that a suitable method for making multi-layered membranes is disclosed in related PCT International Publication No. WO 01/89673. The multi-layered membranes made according to this disclosed method may be modified, according to the methods disclosed herein, so that the tight surface of the multi-layered membrane comprises a more open porous structure compared to a similar unmodified membrane. According to PCT International Publication No. WO 01/89673, two different membrane precursor solutions are simultaneously cast onto a support to form thereon the two or more layers. The solution coated support is then processed in a coagulation bath. Optionally, the solvent or solvents are extracted. The support, if temporary, is then removed. The resultant two layer membrane is then dried, rendering it essentially ready for use. Other methods, including sequential casting, air casting, melt casting, and other phase inversion type methods, are well known and can be used to make the multi-layered structures. Thus a membrane made according to this method can be modified according to the instant invention by altering the casting conditions as described herein, or by altering the tight surface of the membrane after casting as described herein. The result will be a structurally altered membrane having a more porous open tight surface, compared to membranes which have not been altered according to the invention. These membranes may provide better flow for filtering viscous fluids.

In forming multi-layered membranes, one can form the different solutions for the different layers by varying the concentration of polymer, solvent or non-solvent, as well as the viscosity, additives or treatments of the solutions or combinations of any of these to create the desired multi-layered structure.

The invention also relates to single layer asymmetric membranes comprising a modified open porous tight surface. The modified membrane may be suitable for the efficient filtering of fluids of any type including highly viscous fluids such as serum. Methods of making a single-layered structure without a modified surface are known: U.S. Pats. Nos. 4,629,563, 5,444,097, 5,869,174, and 5,886,059. In these processes, one forms a solution, either stable or metastable, and then casts the solution onto a support, optionally exposes the material to the atmosphere for a set period of time, then places the membrane into a coagulation bath. Optionally, one removes the solvent and the support, if temporary, and then dries the resultant membrane. Any of these general methods for casting single layered asymmetric membranes may be adapted to include the methods disclosed herein relating to the modification of a membrane tight surface of a pre-formed membrane.

Suitable polymers for making either multi-layered or single layered membranes include, but are not limited to, PVDF, nylons such as Nylon 66, polyamides, polyimides, polyethersulphones, polysulphones, polyarylsulphones, PVC, PET, polycarbonates, cellulose, regenerated cellulose, cellulose esters such as cellulose acetate or cellulose nitrate, polystyrenes, polyetherimides, acrylic polymers, methacrylic polymers, copolymers of acrylic or methacrylic polymers, or blends of any of the above and the like.

The polymer solutions of the present invention typically comprise at least one polymer and at least one solvent for the polymer or polymers. The solution may contain one or more components that are poor solvents or non-solvents for the polymer or polymers. Such components are sometimes called "porogens" in the art. The solutions may be homogeneous. The polymer solution can be either stable in time (good solvent quality) or meta-stable in time. The solution also can potentially have a lower critical solution temperature or an upper critical solution temperature. Example components of such solutions are well known in the art. Useful solvents include dimethyl formamide, N,N-dimethylacetamide, N-methyl pyrrolidone, tetramethylurea, acetone, dimethylsulfoxide. Useful porogens include formamide, various alcohols and polyhydric compounds, water, various polyethylene glycols, and various salts, such as calcium chloride and lithium chloride.

Generally, one can form the layers of a multi-layered structure from the same polymer and solvent, varying the concentration of components, viscosity, additives and treatment (before, during or after formation) or one can use different polymers for the different layers. When using different polymers one must select polymers that are compatible. Additionally, the solvents and phase separation materials should be the same if possible or at least compatible so that they do not adversely affect the other layer(s).

In certain embodiments, a tight surface of a multi-layered asymmetric membrane may be modified during casting to provide a membrane comprising an open porous surface on the otherwise tight side. In one embodiment the lacquer concentration, e.g. the concentration of solids, for example on the top layer, is adjusted during casting such that the tight surface is opened into a more porous structure. Thus in some embodiments the lacquer concentration may be decreased compared to a similar membrane having a tight porous surface without modification. The lacquer concentration may be decreased by about 1%, about 5%, about 10%, about 15%, about 20%, about 30%, about 40%, about 50% or more compared to the lacquer concentration of a similar membrane having an unmodified tight surface.

In some embodiments the invention provides a method of modifying a membrane tight surface by altering the concentration of lacquer used during casting. The concentration of lacquer used in casting a membrane comprising a modified tight surface having a more open porous structure compared to a similar unmodified membrane, may range from about 1-50% lacquer, from about 1-30% lacquer, from about 1-20% lacquer, from about 5-40% lacquer, from about 5-20% lacquer, from about 8-15% lacquer from about 50% lacquer or more. The skilled artisan will appreciate that the concentration of lacquer, (e.g. the concentration of solids in the lacquer) in the top layer may be affected by the concentration of lacquer in the bottom layer for multi-layered membranes. The skilled artisan will similarly appreciate that if the solids in the top lacquer are too low a non-continuous top layer may form resulting in powder formation which may be undesirable.

In other embodiments the tight surface of a asymmetric membrane may be modified by changing the humidity in area surrounding or proximate to a freshly cast membrane. This may be achieved by adjusting the dew point temperature. In some embodiments a suitable dew point for modifying a tight surface of an asymmetric membrane may range from about 35° F. to about 85° F. In a specific embodiment the dew point may be about 37° F. In other embodiments a suitable dew point may exceed 80° F. In still other embodiments a suitable dew point may be less than 40° F. The skilled artisan will appreciate that the inlet dew point temperature range may depend on the design of the enclosure. If the enclosure is designed so that humid air can be drawn across the surface of the immersion bath and then across the surface of the membrane, the inlet dew point can be about 20° F., but the localized dew point at the drum/bath interface may be about 85° F. If the enclosure is not designed to pull the humid air from the bath, then dew points higher than 20° F. may be suitable.

The microporous structures of the present invention may have an average pore size of from about 0.01 microns to about 10 microns, preferably from about 0.01 to about 2 microns. In various embodiments of the invention the average pore size diameter of a modified tight surface according to the invention may be larger compared to the average pore size on the tight surface of a similar membrane not modified according to the invention. The pores of a modified tight surface according to the invention may comprise more interconnections with neighboring pores compared to a similar membrane tight surface not modified according to the invention.

Asymmetrical membranes may have a pore size gradient of from about 2:1 to about 1000:1, preferably from about 2:1 to about 100:1. This asymmetry is measured by comparing the average pore size on one major surface of the layer with the average pore size of the other major surface of that layer. In accord with the invention, one can create two or more asymmetrical layers, each having a different or similar asymmetry.

Additionally, one can vary the thickness of the membrane and, if two or more layers are used, the thickness of each layer may vary within a wide range and still obtain a self-supporting, integral multi-layered structure. Typically, it is desirable for the thickness of the membrane structure to be between 50 and 200 microns as this provides good filtration characteristics and self support. With the present invention one can still achieve the same overall thickness but can control the relative thickness of one layer to the other to create unique and desirable membrane structures. Typically, one can make one layer as thin as 5 microns and it will result in an integral multilayered structure so long as the remaining structure is a suitable thickness. Thus, for example, in a 150 micron thick membrane, one can have a first layer that is from about 10 to about 140 microns thick while the other is correspondingly from about 140 microns to about 10 microns in thickness.

A variety of parameters may measured to show the tight surface of a porous membrane has been structurally altered. Examples of these parameters include flow time of a viscous fluid such as serum or the like, fractionated area percent, average distance between pores, and gloss measurement of the surface. Thus in certain embodiments the invention provides a membrane with a modified tight surface wherein the tight surface has gloss value measurement of about: 1) 9.5 or less, at a light angle of 60°; 2) 64 or less at a light angle of 85°; 3) 1.6 or less at a light angle of 20°. In other embodiments the invention provides an asymmetric membrane wherein the average distance between pores on the tight side is 0.39 microns or less. In still other embodiments the invention provides an asymmetric membrane comprising a tight surface with porosity, as measured by fractionated area percent, of 16 or greater.

EXAMPLES

Example 1

A test solution comprising 1 liter of Fetal Bovine Serum (FBS) (JRH Bioscience, Inc. Lenexa, Kans.), 1 bottle of Dubelco Modified Eagle medium (133.7 g) (Invitrogen/Gibco Carlsbad, Calif.), 37 grams of sodium bicarbonate, 100 ml Hepes buffer solution (Sigma-Aldrich US St-Louis, Mo.), and 10 liters deionized water was prepared. The solution was stirred before use.

A 47 mm disk was placed in a vacuum filter holder. The flow time in seconds was measured for 500 ml of water and for various volumes of the test solution using 16 inches Hg on three different asymmetrical membranes: i.e., an asymmetrical polysulfone membrane from US Filter Corporation (now Pall Corporation of East Hills, N.Y.); a 0.2 micron Millipore Express® membrane available from Millipore Corporation of Bedford, Mass.; and 4 membranes of the present invention having modified tight surfaces as set forth in the table below.

The water flow rates were as follows:

| Membrane | Bubble Point (psi) | Water Flow Rate (500 ml)(sec) | Porosity (%) |
|---|---|---|---|
| USFilter | 60 | 75 | 81 |
| Millipore Express® | 67 | 99 | 78 |
| M3 | 63.6 | 68 | 79 |
| M5 | 76.6 | 72 | 79 |
| M8 | 63.1 | 64 | 79 |
| M13 | 67.7 | 61 | 79 |

Figure 3:
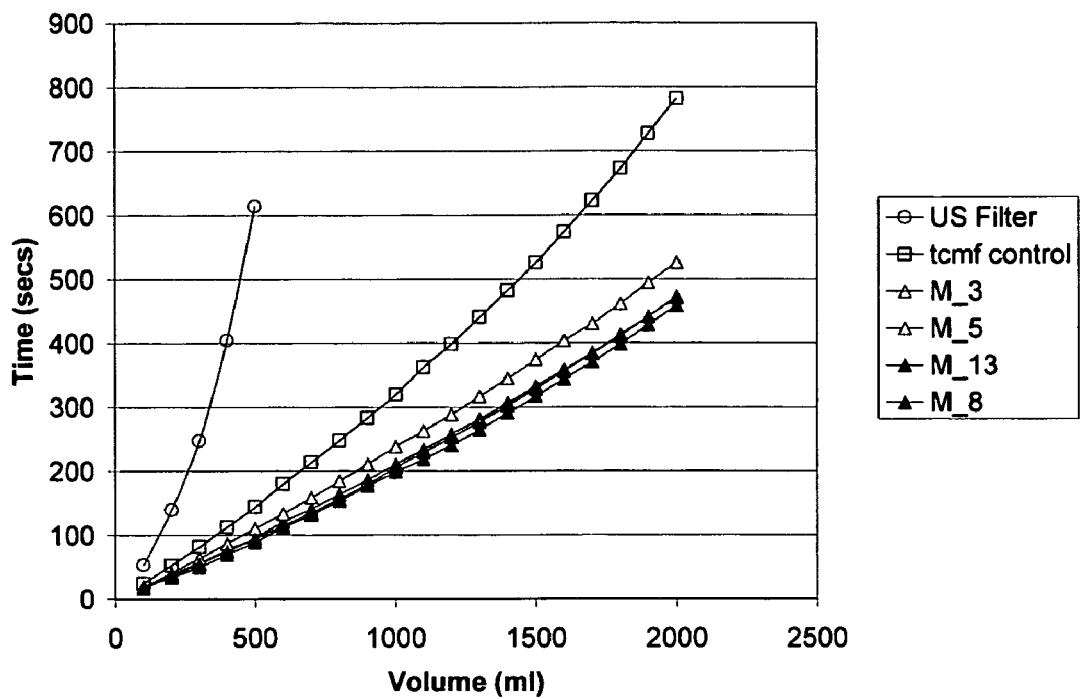
FIG. 3 is a graph of the flow times of the membranes in Example 1.

Plotting the flow times needed to filter certain amounts of the test solution, the graph shown in FIG. 3 was generated. It can be seen therein that the membranes of the present invention has a clear advantage, a shorter flow time, over the membranes of the prior art particularly for filtering solutions containing viscous material such as serum. Good results are obtained in respect of the total volume that can be filtered by such membranes, as well as the speed at which such membranes filter a standard amount of solution (500 ml).

Figure 4:
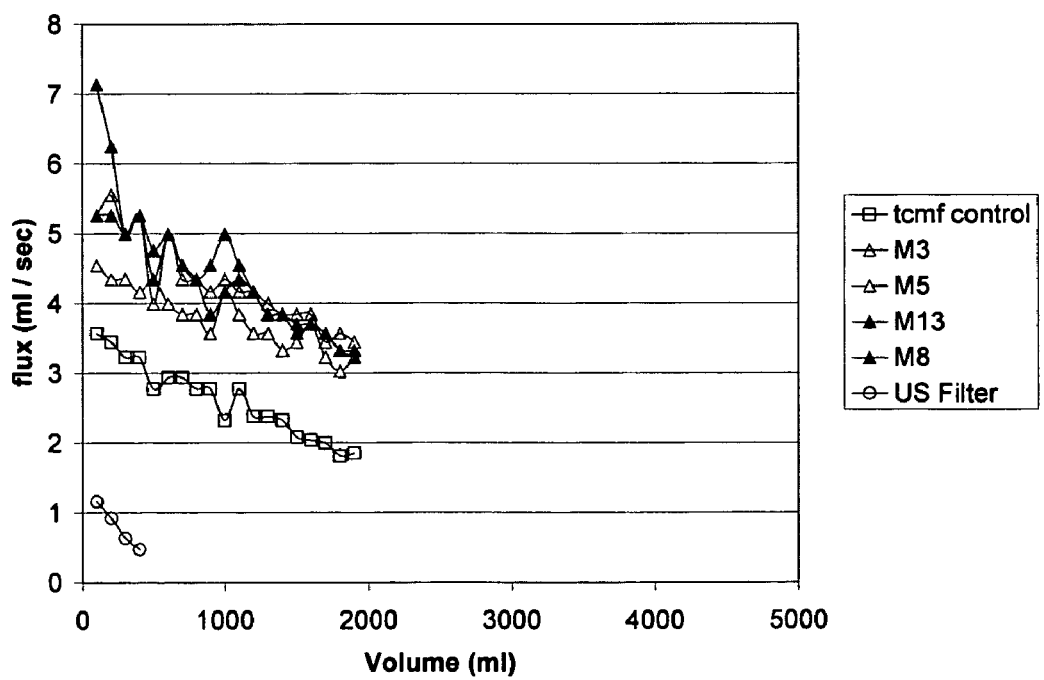
FIG. 4 is a graph of the flux of the membranes in Example 1.

Surprisingly, the flux of the Sample membranes is higher, and remains higher, than the prior art membranes. (See FIG. 4).

Based upon this data, one can extrapolate and estimate the total amount of fluid that can be filtered by these filters with sufficiently high flux:

| Membrane | Total Volume Filtered Estimated (Liters) | Initial Flux (at 100 ml filtered) | Flux at 500 ml Filtered (ml/sec) |
|---|---|---|---|
| US Filter | 0.6 | 1.2 | 0.4 |
| Millipore Express® | 3.7 | 3.6 | 2.7 |
| M3 | 5.7 | 5.0 | 4.0 |
| M5 | 5.2 | 4.3 | 4.3 |
| M8 | 5.7 | 5.0 | 4.3 |
| M13 | 5.7 | 5.0 | 4.7 |

Example 2

A test solution comprised of 250 ml New Born Calf Serum (Gibco BRL, Carlsbad, Calif.), 1 bottle of Dulbeco Modified Eagle medium (133.7 g.), 37 grams of sodium bicarbonate,

| Membrane | % Solids Bottom | % Solids Top | Bath | Speed (fpm) | IPA Bpt (psi) | Total Thickness | Phobic Flow Time (secs/500 ml) |
|---|---|---|---|---|---|---|---|
| M3 | 17 | 11 | 53 | 17.5 | 22 | 174 | 68.07 |
| M5 | 17 | 11 | 54 | 21 | 22 | 180 | 72.01 |
| M8 | 17 | 11 | 54 | 16 | 21 | 174 | 63.94 |
| M13 | 17 | 11 | 55 | 20.5 | 22 | 176 | 61.31 |

| Membrane No. | Cld Pt Bottom | Cld Pt Top | % Solids Bottom | % Solids Top | Bath | Speed (fpm) | Air Temp (F.) | Air Dew Point (F.) | Pump Bottom | Pump Top | Online Auto Bpt | Total Thickness |
|---|---|---|---|---|---|---|---|---|---|---|---|---|
| 082701-03 | 48 | 43 | 17 | 11 | 53 | 17.5 | 70 | 20 | 288 | 175 | 22.42 | 173.8 |
| 082701-05 | 48 | 43 | 17 | 11 | 54 | 21 | 70 | 20 | 344 | 210 | 22.12 | 179.5 |
| 082701-08 | 48 | 43 | 17 | 11 | 54 | 16 | 70 | 21 | 262 | 160 | 21.42 | 173.8 |
| 082701-13 | 48 | 43 | 17 | 11 | 55 | 20.5 | 70 | 21 | 336 | 205 | 22.38 | 176.3 |

Note in the above table 082701-03, 082701-03, 082701-03, and 082701-03 refer to M3, M5, M8 and M13 respectively.

100 ml Hepes buffer solution, and 10 liters deionized water was prepared. The solution was stirred before use.

A 47 mm disk was placed in a vacuum filter holder using a vacuum of 16 inches Hg, the flow time in seconds was measured for various volumes of the test solution on a 0.2 micron Millipore Express® membrane (Millipore Corporation of Bedford, Mass.), and 4 sample membranes of the present invention (Samples 2A-D).

Figure 5:
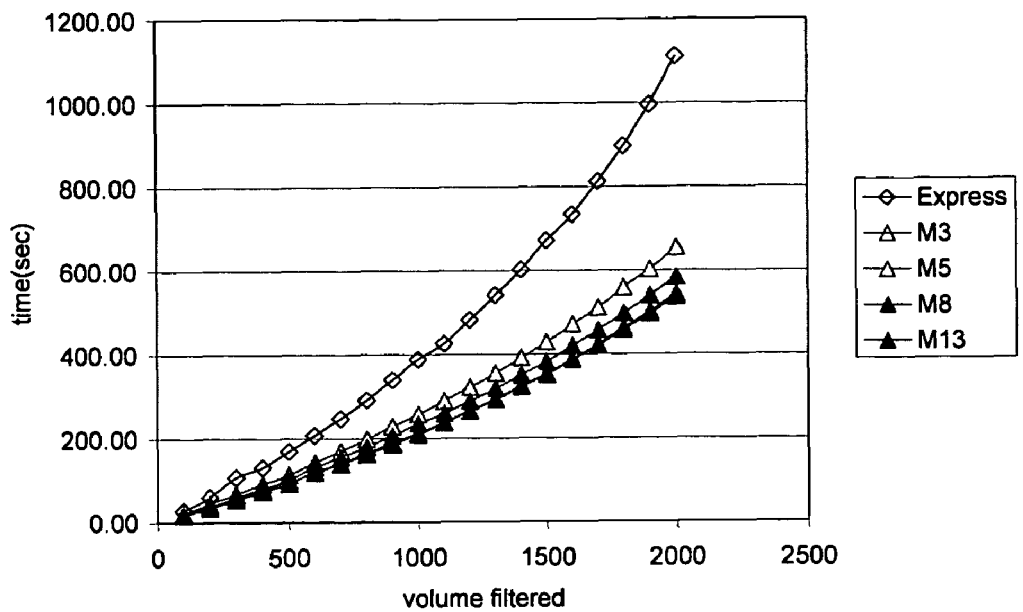
FIG. 5 is a graph of the flow times of the membranes in Example 2.
Figure 6:
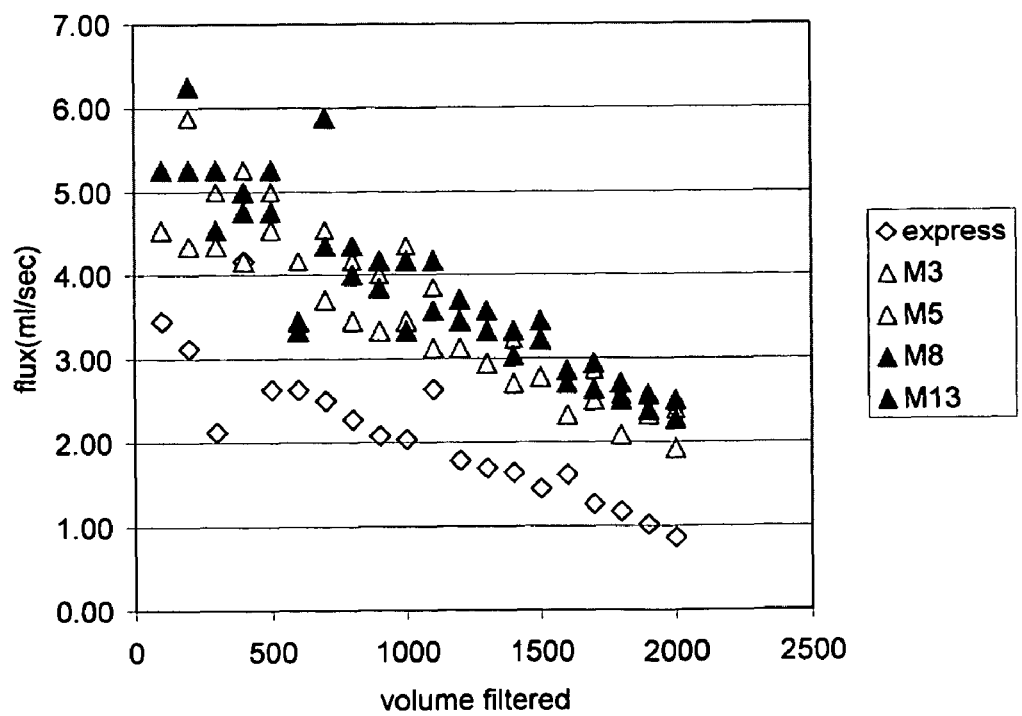
FIG. 6 is a graph of the flux of the membranes in Example 2.

FIGS. 5 and 6—prepared from data from this Example—show volume filtered versus time, and volume filtered versus flux, respectively, and demonstrate that the sample membranes of the present invention outperformed the prior art membrane.

Plotting the flow times to filter certain volumes of the solution indicates that the sample membranes have an advantage over existing membranes in both flow and the total volume that can be filtered. Estimations on the volume that can be filtered through a 47 mm diameter disk based on the data of this experiment are given below:

| Membrane | Total Volume Filtered Estimated (Liters) | Initial Flux (at 100 ml filtered) | Flux at 500 ml (ml/sec) |
| --- | --- | --- | --- |
| Millipore Express ® | 2.7 | 3.5 | 2.6 |
| M3 | 3.6 | 5.2 | 5.0 |
| M5 | 3.5 | 4.6 | 4.6 |
| M8 | 3.7 | 5.3 | 5.2 |
| M13 | 3.5 | 5.3 | 4.8 |

Example 3

A co-cast membrane was made in accordance with the methodology described in related PCT International Publication No. WO 01/89673 (18%+12% PES-NMP-TEG). The tight surface was modified according to the instant The total thickness of the resultant membrane was about 140 micron, with the upper layer within the membrane measuring about 10 microns in thickness. This membrane had a similar bubble point as a 0.45 rated Supor membrane (Pall-Gelman, East Hills N.Y.). Flow was tested on both water and fetal bovine serum. The following table shows the decreased time for this membrane to filter 500 ml of serum through a 47 mm disk. For reference, a 0.2 rated Millipore Express® membrane (Millipore Corp., Bedford, Mass.) was used. The membranes were tested in two orientations tight side (i.e shiny side) up and tight side down.

| time FBS(sec) | Orientation | BP IPA (psi) | Flow time water (sec) | Flow time FBS (sec) |
| --- | --- | --- | --- | --- |
| Millipore Express ® | Shiny Side Downstream | 22 | 100 | 162 |
| Example 3 | Shiny Side Upstream | 11.5 | 32 | 95 |
| Example 3 | Shiny Side Downstream | 11.5 | 32 | 58 |
| 0.45 Supor | Shiny Side Downstream | 12 | 68 | 138 |
| 0.45 Supor | Shiny Side Upstream | 12 | 68 | Unable to filter 500 ml |

Example 4

A fetal bovine serum test was performed on 4 different types of membranes: a single layer asymmetric membrane of the prior art (Millipore Express® membrane) (Millipore Corp., Bedford, Mass.), a PES co-cast membrane, a Sartopore 2 asymmetrical membrane (both layers in orientation of the cartridge from which they were removed), and the 0.2 rated membrane layer of the Sartopore 2 product (Sartorius AG of Goeftingen, Germany).

This resulted in the following times (in seconds) to filter 500 ml of FBS:

| Membrane | Flow Time FBS (sec) |
| --- | --- |
| Millipore Express ® | 159 |
| Millipore Express ® | 169 |
| Example 4 | 113 |
| Sartopore 2 (0.45 + 0.2) | 500 |
| Sartopore 2 (0.2 layer) | >900 for 450 ml |

Example 5

Figure 7:
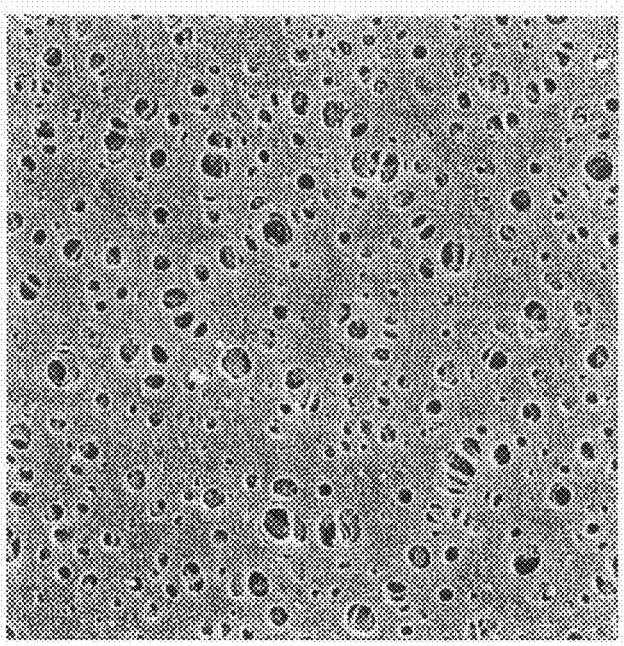
FIG. 7 shows a photomicrograph of the tight surface of a low porosity surfaced membrane according to the prior art.
Figure 8:
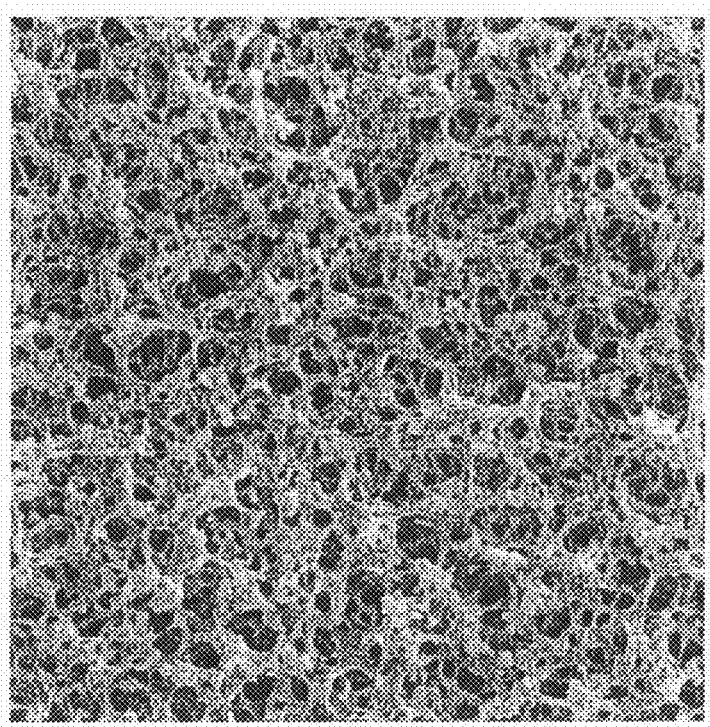
FIG. 8 shows a photomicrograph of the tight surface of a low porosity surfaced membrane according to the prior art after being surface modified by the techniques of the present invention.

Two pieces of single layer microporous asymmetric membrane with different bubble points (Millipore Express® 0.2 micron membrane) (Millipore Corporation, Bedford, Mass.) were obtained. The low porosity surface on the tight side of each membrane was ablated in a plasma chamber using oxygen. FIG. 7 shows the tight surface of one of the membranes before plasma ablation. FIG. 8 shows the tight surface of that membrane after plasma ablation.

The ablated membranes were tested for flow and throughput.

As observed, the removal of the low porosity layer by plasma ablation resulted in an increased performance over non-treated samples. In particular, there was an approximately 25% decrease in water flow time as compared to non-treated membranes. For fetal bovine serum (FBS) flow time decreased by about 17% compared to non-treated membranes.

The data suggests that the improved performance is not simply a function of the change in bubble point. In this regard, one can assume that a linear relationship exists between water bubble point and water flow time and FBS flow time. The relationship, determined from empirical data, was 4.8 sec/psi for water flow time and 2.8 sec/psi FBS. With this relationship, the performance improvement cannot be attributable to the bubble point change alone. A change in only the bubble point would create an expected performance increase of only about 10% for water flow time and 4% for FBS. Increased tight surface porosity has a measurable positive impact on the membrane performance.

Example 6

To quantify the differences between a typical tight-sided asymmetric membrane of the prior art and a highly reticulated open structure of the present invention, the pore distributions on the tight of side of a prior art membrane (Millipore Express® 0.2 membrane) (Millipore Corporation, Bedford, Mass.) and a membrane of the present invention (a two layered structure having a pore size rating of 0.2 micron) was analyzed. Using photomicrographs of the respective tight surfaces, two measurements were made: "fractionated area percent", which is a measure of the surface porosity; and "nearest neighbor distance", which is a measure of the average distance between pores. Fractionated area is measured through image analysis in which the overall fraction of open pore on the surface (in the SEM images this corresponds to the dark regions) is determined versus the whole area of the image. The nearest neighbor distance is defined by converting the pores in the image to elliptical idealized pores and measuring the distance between the edges of these pores. Based upon these measurements, the following data was gathered.

|  | Fractionated Area Percent | | Nearest Neighbor | |
| --- | --- | --- | --- | --- |
|  | Prior Art | Invention | Prior Art | Invention |
| Mean | 6.778 | 16.010 | 0.571 | 0.398 |
| Standard Deviation | 0.755 | 0.978 | 0.186 | 0.099 |

Figure 9:
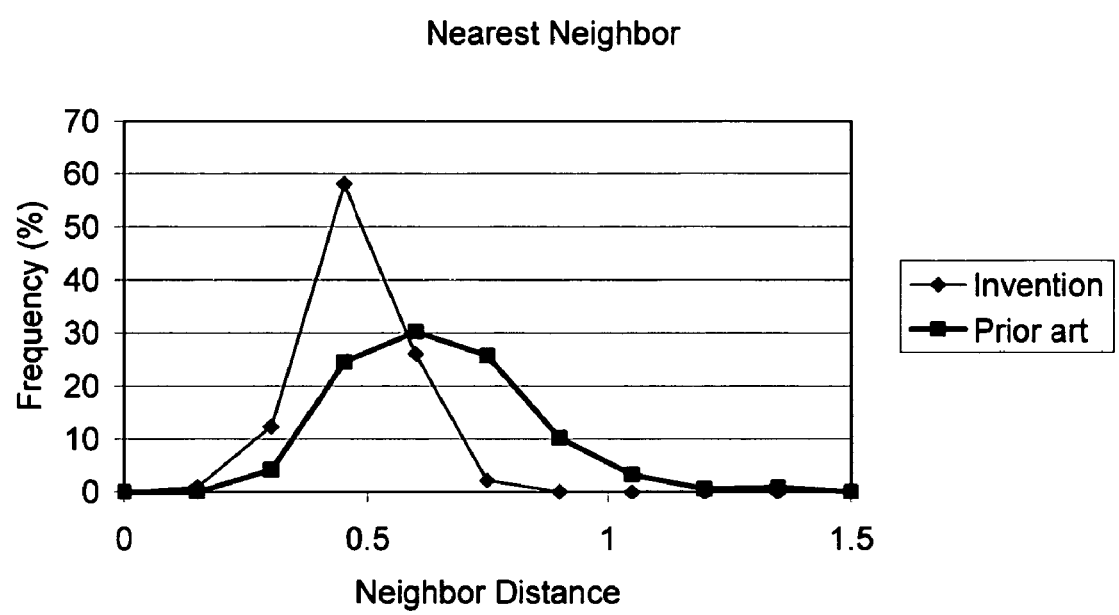
FIG. 9 is a graph of the nearest neighbor pore data.

FIG. 9 shows a graphical representation of the Nearest Neighbor data for the two membranes.

Figure 10:
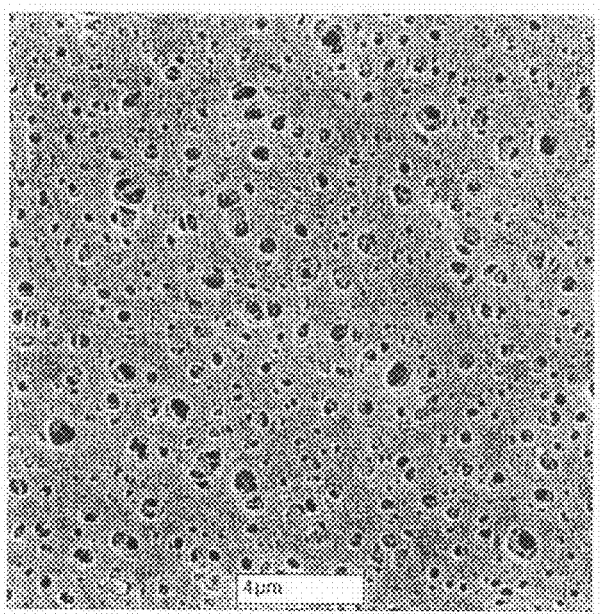
FIG. 10 shows a photomicrograph of the tight surface of a membrane according to the prior art.

FIG. 10 shows a photomicrograph of the tight surface according to the prior art.

Figure 11:
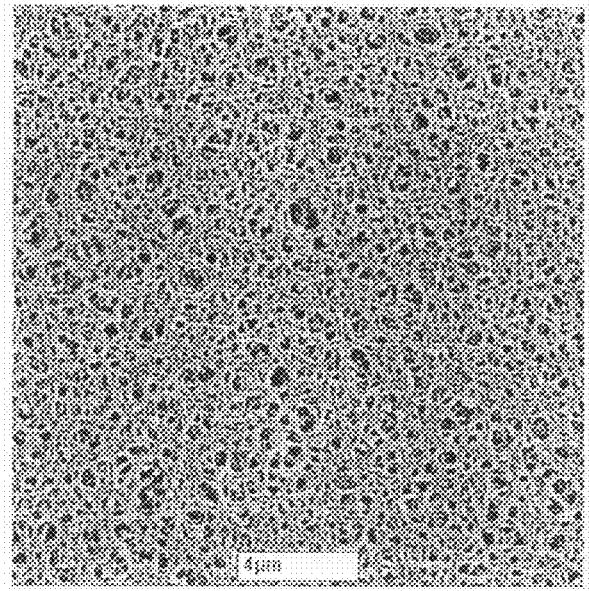
FIG. 11 shows a photomicrograph of the tight surface of a membrane according to the present invention.

FIG. 11 shows a photomicrograph of the tight surface of the prior art membrane used in the example.

The fractionated Area Percent for the membrane of the present invention is more than 2 times that of the prior art membrane. Likewise, the spacing between adjacent pores on the tight surface of the membrane of the present invention is nearly half that of the prior art membrane.

Example 7

A co-cast membrane was made in accordance with methodology described in PCT International Publication No. WO 01/89673. A fetal bovine serum (FBS) test and water flow time test were performed on the resultant "low bubble point" surface-modified co-cast membrane. A flow time (500 ml of FBS) of 41 seconds and a water visual bubble of 21.5 psi were observed, yielding a ratio (i.e., FBS flow time divided by water BP) of 1.9.

The FBS flow time test was conducted as described in Example 1. In particular, the test solution was made of 1 liter of Fetal Bovine Serum, 1 bottle of Dulbeco's Modified Eagle medium, 37 grams of sodium bicarbonate, 100 ml Hepes solution and 10 liters deionized water. The solution was stirred before use. A 47 mm disk was placed in a vacuum filter holder and sealed with a vacuum holder funnel. Using a vacuum of 16 inches Hg, the flow time in seconds was measured for filtering 500 ml of serum solution and was determined to be 41 seconds. The water bubble point measured on the disk was 21.5 psi.

Figure 12:
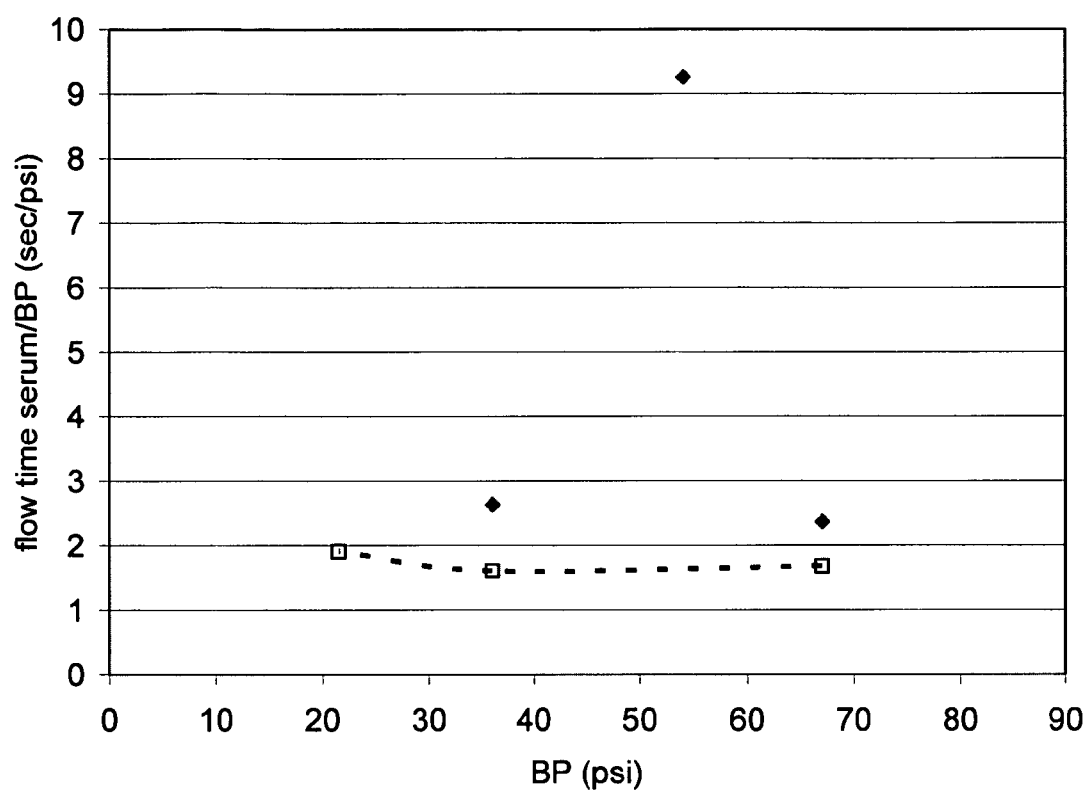
FIG. 12 is a graph plotting data described in Example 7.

Using the above data, FBS flow time (sec) was then divided by the water bubble point (psi). This ratio is set forth in FIG. 12 and the following table:

|  | water BP (psi) | FBS flow time (sec) | ratio FBS FT/BP (sec/psi) |
| --- | --- | --- | --- |
| Supor | 36 | 95 | 2.6 |
| TCMF | 67 | 159 | 2.4 |
| Sartopore | 54 | 900 | 16.7 |
| Sartopore 2 | 54 | 500 | 9.3 |
| Example 4 | 67 | 113 | 1.7 |
| Example 3 | 36 | 58 | 1.6 |
| Example 7 | 21.5 | 41 | 1.9 |

The inventive membranes (Examples 3, 4, and 7) each have a BP corrected FBS flow time smaller than 2. The values for the other commercial membranes are significantly higher.

Example 8

Figure 13:
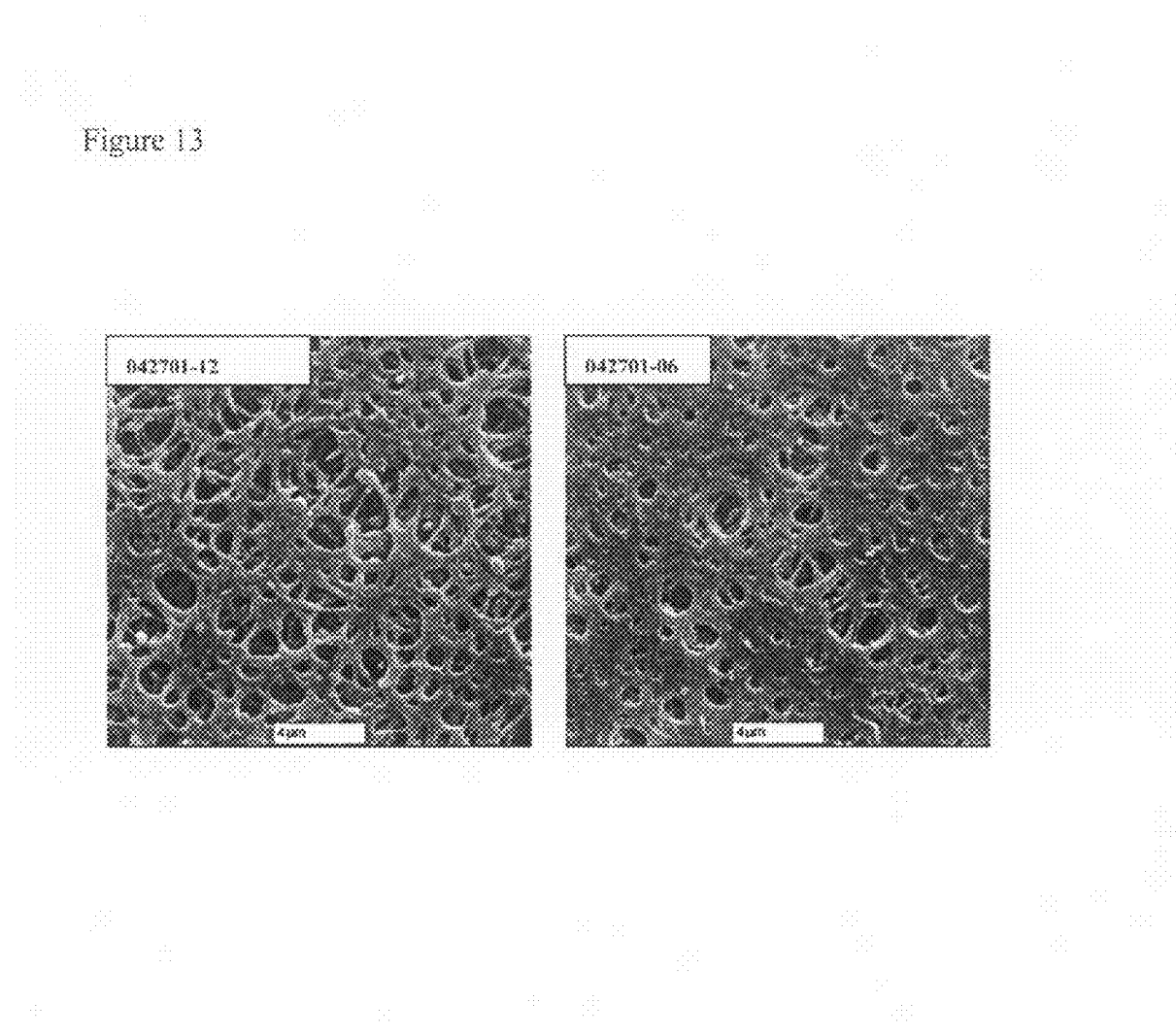
FIG. 13 shows SEM of two tight surfaces of a membrane. The membrane pictured on the left (12) was made with a 11% Top Lacquer and the membrane on the right (06) was made with a 13.5% Top Lacquer.

The SEM images in FIG. 13 shows a matched pair of membranes made under the same process conditions where only the top layer solids were varied. The conditions for casting the membranes are provided in the table below. The change in surface morphology with respect to top layer solids concentration is clearly demonstrated in FIG. 13 where the 11% top layer resulted in a higher surface porosity than the sample made using the 13.5% top layer lacquer.

| Lot No. | Roll No. | Solids Concentration (%) | | IPA BP (psi) |
| --- | --- | --- | --- | --- |
| | | Bottom | Top | Ave |
| 042701 | 06 | 17 | 13.5 | 23.4 |
| 042701 | 12 | 17 | 11 | 24.6 |

Example 9

The effect of humidity on membrane tight sides was examined. Co-cast membranes were cast in accordance with the methodology described in PCT International Publication No. WO 01/89673 (17%+11.5% PES-NMP-TEG) while exposing the freshly coated lacquer to varying degrees of moisture before it was immersed in a coagulation bath. The range of conditions probed represented the extremes of the environmental conditions which could be possible within the frame work of the defined process. Processing the membrane at the extremes demonstrates how environmental conditions may be used to modify the surface morphology and performance of the cast membrane.

Figure 14:
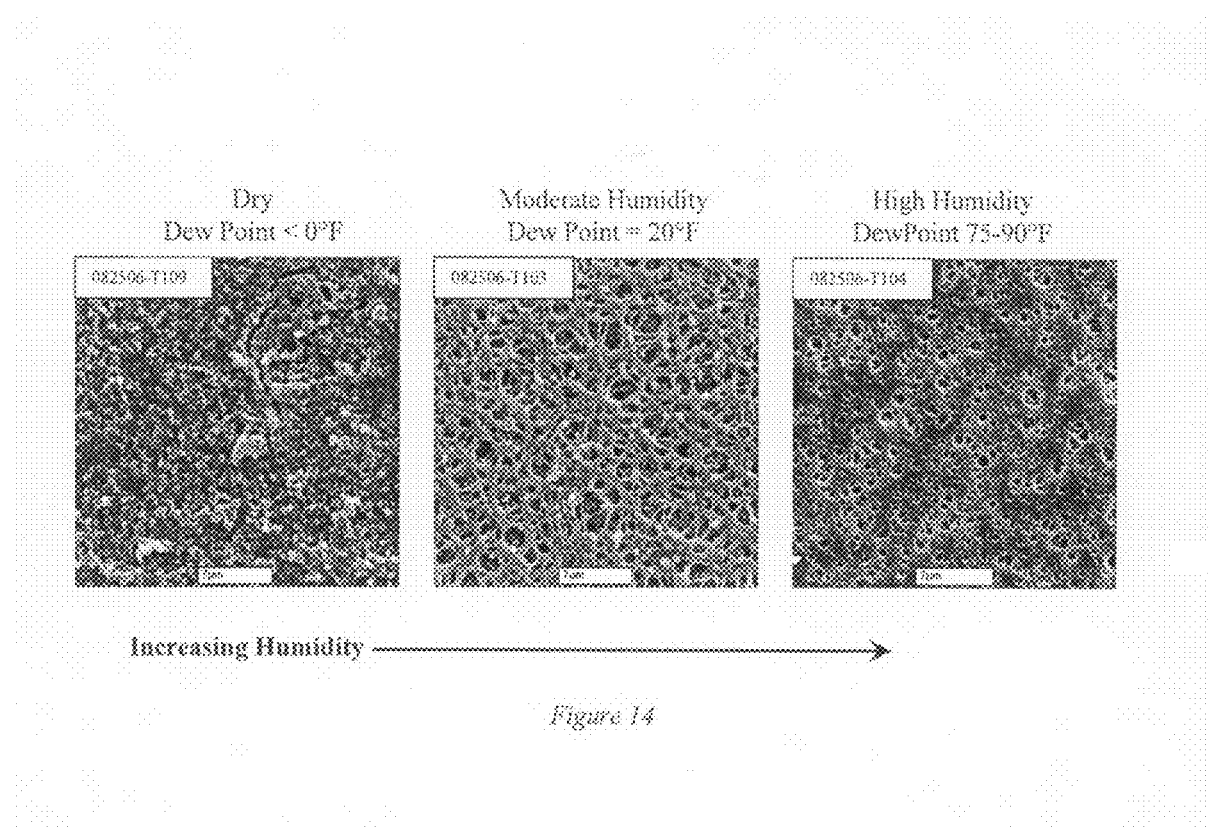
FIG. 14 are SEM comparing tight surfaces of membranes cast under varying dew point conditions.
Figure 15:
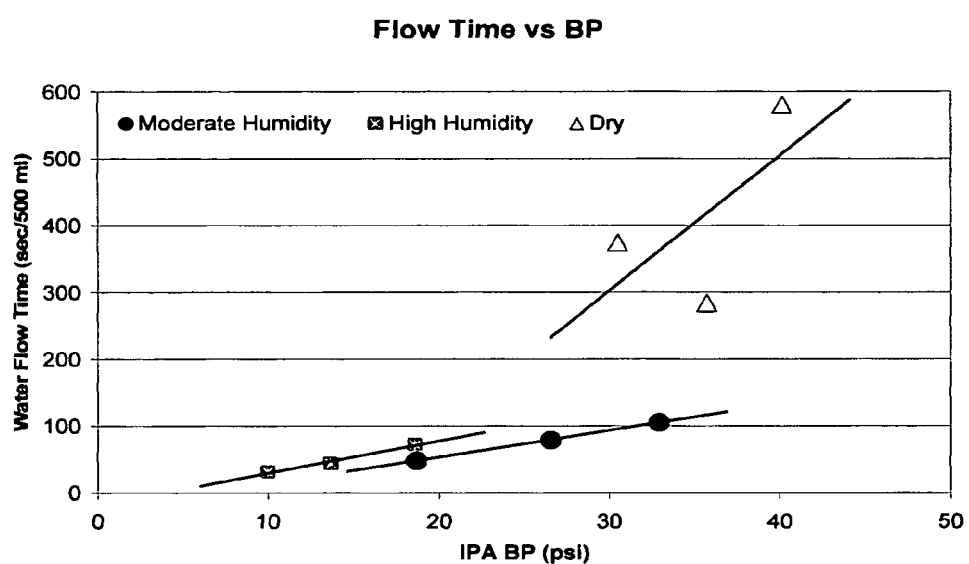
FIG. 15 is a graph comparing bubble point versus flow time for membranes having surfaces modified under varying conditions of humidity and temperature.

The effect of moisture exposure is seen in the SEM images in FIG. 14. The images show a progression in the surface porosity as the level of moisture is raised. The surface porosity progresses from skinned (Dry Environment) to a highly porous structure at moderate humidity and progressing further to the point where skinning begins to occur once again in a high humidity environment. The level of skinning seen in the SEM images is also reflected in the performance of the membrane (see FIG. 15). It is clear from the data that the skinning on the membrane made using the dry conditions resulted in a significant performance penalty as compared to the high surface porosity sample made at the moderate condition. A performance advantage is also evident when looking at the membrane made with the high humidity which has a moderately skinned surface. However, it is expected that if the humidity is increased further, the skinning will also increase resulting in a performance penalty.

Example 10

Another example of the impact of moisture on the surface porosity of the membrane was demonstrated using a small enclosure over the casting drum. Co-cast membranes were made in accordance with the methodology described in PCT International Publication No. 01/89673 (17%+11.5% PES-NMP-TEG). According to the invention air at different volumetric flow rates and dew points was fed into the enclosure. The following is a summary of the process conditions:

| Lot No. | Roll # | Line Speed (fpm) | Air Flow (lpm) | Air DewPoint (deg F.) | Air Temp (deg F.) |
|---------|--------|------------------|----------------|------------------------|-------------------|
| KT03015 | 110    | 20               | 20             | 100                    | 54                | 100 |
| KT03015 | 111    | 20               | 200            | 54                     | 100               |
| KT03015 | 112    | 20               | 150            | 54                     | 100               |
| KT03015 | 113    | 20               | 150            | 37                     | 100               |
| KT03015 | 114    | 20               | 100            | 37                     | 100               |
| KT03015 | 115    | 20               | 200            | 37                     | 100               |
| KT03015 | 116    | 20               | 200            | 25                     | 100               |
| KT03015 | 117    | 20               | 150            | 25                     | 100               |
| KT03015 | 118    | 20               | 200            | 25                     | 100               |

Functional test results are provided below:

| Lot No. | Roll # | IPA BP (psi) Ave | Flow Time (secs/500 ml) Ave | Thickness (um) Ave | Porosity (%) |
|---------|--------|------------------|-----------------------------|--------------------|--------------|
| KT03015 | 110    | 20.80            | 53.19                       | 174.40             | 79.4         |
| KT03015 | 111    | 18.97            | 52.28                       | 172.60             | 79.3         |
| KT03015 | 112    | 19.66            | 55.89                       | 172.20             | 79.0         |
| KT03015 | 113    | 23.46            | 68.71                       | 177.40             | 80.2         |
| KT03015 | 114    | 22.92            | 87.01                       | 183.80             | 80.0         |
| KT03015 | 115    | 24.25            | 73.81                       | 179.80             | 79.7         |
| KT03015 | 116    | 26.82            | 111.55                      | 182.20             | 79.3         |
| KT03015 | 117    | 27.97            | 108.18                      | 180.60             | 79.3         |
| KT03015 | 118    | 26.44            | 106.62                      | 184.40             | 79.4         |

Figure 16:
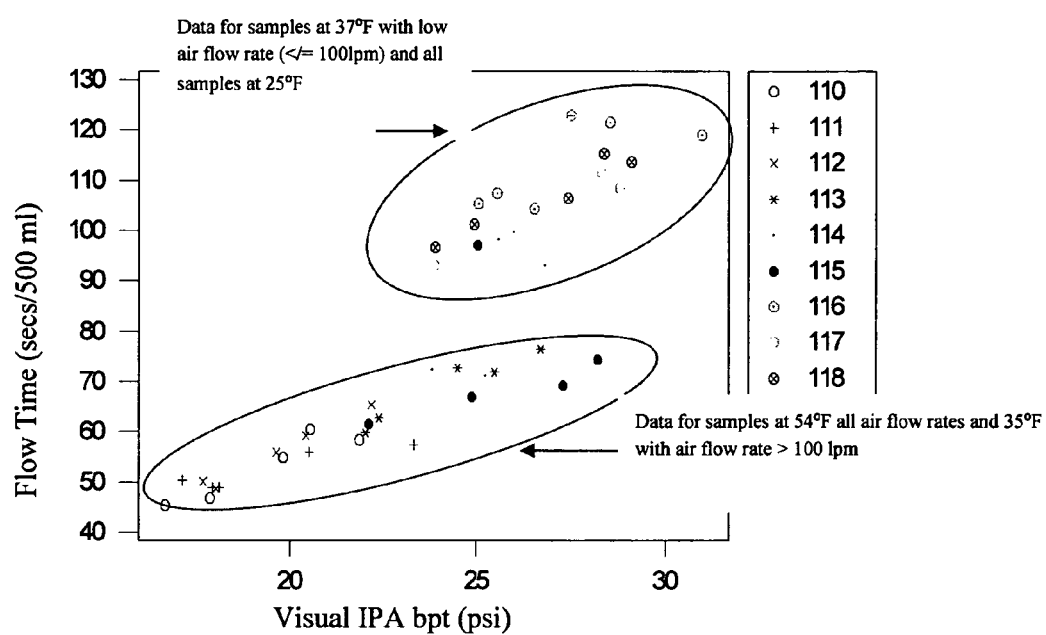
FIG. 16 is a graph of IPA bubble point versus water flow time.

A graph of individual data points of IPA Bubble point (psi) vs Water Flow Time (secs/500 ml @ 27 in Hg) shows two distinct populations. All of the samples produced with dew points at 54° F. and all of the samples produced at 37° F. dew point and air flow >100 lpm had a significantly better flow performance for a given bubble point (FIG. 16).

Figure 17:
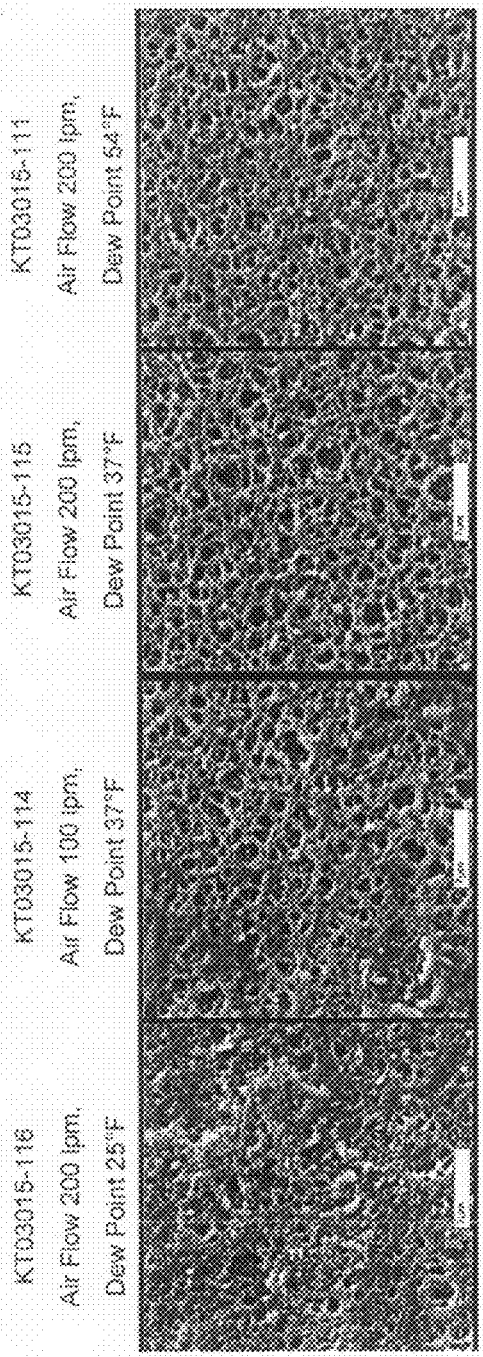
FIG. 17 are photomicrographs showing the effect of humidity on tight side pore structure of asymmetric membranes.

SEM images clearly show that the cause of the differences in performance is due to a change in surface porosity with dew point. As the moisture exposure over the surface of the membrane is increased there's a significant increase in surface porosity (FIG. 17).

Example 11

A BYK Gardner Micro-Tri Gloss meter (Byk Gardner USA, Riverspark, Ill.) was used to compare the gloss of membrane surfaces modified according to the invention and the prior art. The measurement was done at three different light angles. The data, summarized in the table below, clearly shows a significant difference in gloss measurements between the prior art and the modified membranes of the invention.

| Gloss Measurements (GU) (for "tight" side of membrane) | | |
|---|---|---|
| | Prior Art | Invention |
| 20° | | |
| Average | 19.9 | 1.6 |
| stdev | 7.0 | 0.1 |
| 60° | | |
| Average | 73.5 | 9.5 |
| stdev | 6.4 | 2.7 |
| 85° | | |
| Average | 90.5 | 64.4 |
| stdev | 9.9 | 6.6 |

A lower value in gloss measurements can be associated with more open surfaces.

Many modifications and variations of this invention can be made without departing from its spirit and scope, as will be apparent to those skilled in the art. The specific embodiments described herein are offered by way of example only and are not meant to be limiting in any way. It is intended that the specification and examples be considered as exemplary only, with a true scope and spirit of the invention being indicated by the following claims.

The invention claimed is:

1. A method of increasing the surface porosity of a tight side of an asymmetric membrane comprising forming an asymmetric membrane having a tight side and an open side and wherein the tight side has a skin surface, performing a post-formation surface modification by the step of filling the membrane with a non-solvent and then contacting the skin surface of the preformed membrane with a solvent suitable for increasing the porosity of an asymmetric membrane tight side wherein the non-solvent is immiscible in the solvent.

2. The method of claim 1, wherein the membrane is a multi-layered membrane.

3. The method of claim 1, wherein the membrane is a preformed single layered membrane.

4. A method of increasing the surface porosity of a tight side of an asymmetric membrane comprising forming an asymmetric membrane having a tight side and an open side and wherein the tight side has a skin surface, performing a post-formation surface modification by the step of filling the membrane with a non-solvent, selecting a solvent suitable for increasing the porosity of an asymmetric membrane tight side, controlling a concentration of a solvent and then contacting the skin surface of the preformed membrane with the solvent wherein the non-solvent is immiscible in the solvent.

5. The method of claim 4 wherein the membrane is a preformed single layered membrane.

6. The method of claim 4 wherein the membrane is a multi-layered membrane.

* * * * *